(12) United States Patent
Amikura et al.

(10) Patent No.: US 11,994,234 B2
(45) Date of Patent: May 28, 2024

(54) GATE VALVE AND DRIVING METHOD

(71) Applicant: Tokyo Electron Limited, Tokyo (JP)

(72) Inventors: Norihiko Amikura, Miyagi (JP); Masatomo Kita, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 17/990,397

(22) Filed: Nov. 18, 2022

(65) Prior Publication Data

US 2023/0160494 A1    May 25, 2023

(30) Foreign Application Priority Data

Nov. 19, 2021 (JP) ................................. 2021-188737

(51) Int. Cl.
*F16K 51/02* (2006.01)
*F16K 31/42* (2006.01)

(52) U.S. Cl.
CPC ............ *F16K 31/423* (2013.01); *F16K 51/02* (2013.01)

(58) Field of Classification Search
CPC .......... F16K 31/423; F16K 51/02; F16K 3/24; F16K 17/02; F16K 3/188; F16K 3/0254; F16K 3/18; F16K 3/124; F16K 31/1245; H01L 21/67126; H01L 21/67; H01L 21/67373; H01L 21/6719
USPC ......................................... 251/326, 629, 62
See application file for complete search history.

(56) References Cited

U.S. PATENT DOCUMENTS

| | | | | |
|---|---|---|---|---|
| 6,056,266 A * | 5/2000 | Blecha | ............... | F16K 31/122 251/193 |
| 6,311,949 B1 * | 11/2001 | Iida | ........................ | E02B 7/36 251/193 |
| 2012/0247564 A1 * | 10/2012 | Kho | ........................ | F16K 3/188 251/318 |
| 2012/0258242 A1 * | 10/2012 | Tsunoda | ............... | F16K 3/184 251/62 |
| 2015/0075659 A1 * | 3/2015 | Rice | ........................ | F16K 3/188 137/861 |
| 2017/0186633 A1 * | 6/2017 | Kamiya | ............ | H01L 21/67739 |

FOREIGN PATENT DOCUMENTS

JP            2018-010986 A         1/2018

* cited by examiner

*Primary Examiner* — Craig J Price
*Assistant Examiner* — Andrew J Rost
(74) *Attorney, Agent, or Firm* — PROCOPIO, CORY, HARGREAVES & SAVITCH LLP (57) ABSTRACT

A gate valve opens and closes a first opening of a first chamber in a vacuum processing apparatus. The gate valve includes: a valve element configured to open and close the first opening; a drive configured to move the valve element so that the valve element takes at least a closing position, where the valve element closes the first opening, and an opening position, where the valve element opens the first opening; a first gas line and a second gas line; and a first switching valve that connects one of the first gas line and the second gas line to the drive. The drive moves the valve element from the opening position to the closing position by pressure of gas supplied from the first gas line or the second gas line, and holds the valve element at the closing position by pressure of gas supplied from the second gas line.

10 Claims, 6 Drawing Sheets

GATE VALVE AND DRIVING METHOD

CROSS-REFERENCE TO RELATED APPLICATIONS

The present application claims priority under 35 U.S.C. § 119 to Japanese Patent Application No. 2021-188737 filed on Nov. 17, 2021, the entire contents of which are incorporated herein by reference.

BACKGROUND

Field

Exemplary embodiments of the present disclosure relate to gate valves and driving methods.

Description of Related Art

Japanese Patent Application Laid-Open No. 2018-10986 describes a gate valve having a valve element that moves between the closing position and the opening position.

SUMMARY

One exemplary embodiment of the present disclosure provides a gate valve, which opens and closes a first opening of a first chamber in a vacuum processing apparatus. The gate valve includes a valve element configured to open and close the first opening; a drive configured to move the valve element so that the valve element takes at least a closing position, where the valve element closes the first opening, and an opening position, where the valve element opens the first opening; a first gas line connected to the drive; and a second gas line connected to the drive. The drive moves the valve element from the opening position to the closing position by pressure of gas supplied from the first gas line or the second gas line, and holds the valve element at the closing position by pressure of gas supplied from the second gas line.

DETAILED DESCRIPTION

The following describes embodiments of the present disclosure.

One exemplary embodiment provides a gate valve that opens and closes a first opening of a first chamber in a vacuum processing apparatus. The gate valve includes: a valve element configured to open and close the first opening; a drive configured to move the valve element so that the valve element takes at least a closing position, where the valve element closes the first opening, and an opening position, where the valve element opens the first opening; a first gas line and a second gas line; and a first switching valve that connects one of the first gas line and the second gas line to the drive. The drive moves the valve element from the opening position to the closing position by pressure of gas supplied from the first gas line or the second gas line, and holds the valve element at the closing position by pressure of gas supplied from the second gas line.

In one exemplary embodiment, the first switching valve has a normally closed valve that changes a connection as to whether or not to supply gas from the first gas line to the drive; and a normally open valve that changes a connection as to whether or not to supply gas from the second gas line to the drive.

In one exemplary embodiment, the drive has an air cylinder that moves the valve element, and the first switching valve changes a connection as to whether the air cylinder is connected to the first gas line or to the second gas line.

One exemplary embodiment further includes a third gas line connected to the drive, wherein the drive holds the valve element at the opening position by pressure of gas supplied from the third gas line.

One exemplary embodiment further includes a second switching valve that changes a connection as to whether gas is supplied to the first gas line or to the third gas line.

In one exemplary embodiment, the gas supplied to the first gas line, the gas supplied to the second gas line, and the gas supplied to the third gas line are compressed air.

One exemplary embodiment provides a method for driving a gate valve that opens and closes a first opening of a first chamber in a vacuum processing apparatus. The gate valve includes: a valve element configured to open and close the first opening; a drive configured to move the valve element so that the valve element takes at least a closing position, where the valve element closes the first opening, and an opening position, where the valve element opens the first opening; a first gas line and a second gas line; and a first switching valve that connects one of the first gas line and the second gas line to the drive; and a controller. The driving method includes the drive moving the valve element from the opening position to the closing position by pressure of gas supplied from the first gas line or the second gas line; and the drive holding the valve element at the closing position by pressure of gas supplied from the second gas line.

In one exemplary embodiment, the first switching valve has a normally closed valve that changes a connection as to whether or not to supply gas from the first gas line to the drive, and a normally open valve that changes a connection as to whether or not to supply gas from the second gas line to the drive.

In one exemplary embodiment, the drive has an air cylinder that moves the valve element, and the first switching valve changes a connection as to whether the air cylinder is connected to the first gas line or to the second gas line.

One exemplary embodiment further comprise a third gas line connected to the drive, wherein the drive holds the valve element at the opening position by pressure of gas supplied from the third gas line.

One exemplary embodiment further comprises a second switching valve that changes a connection as to whether gas is supplied to the first gas line or to the third gas line.

In one exemplary embodiment, the gas supplied to the first gas line, the gas supplied to the second gas line, and the gas supplied to the third gas line are compressed air.

The following describes embodiments of the present disclosure in details with reference to the drawings. Like reference numerals designate like elements in the drawings to omit their duplicated descriptions. Unless otherwise specified, positional relationships such as top, bottom, left, and right will be described based on the positional relationships illustrated in the drawings. The accompanying drawings have not necessarily been drawn to scale, and the actual proportions are not limited to the illustrated ones.

<Configuration of Substrate Processing System PS>

Figure 1:
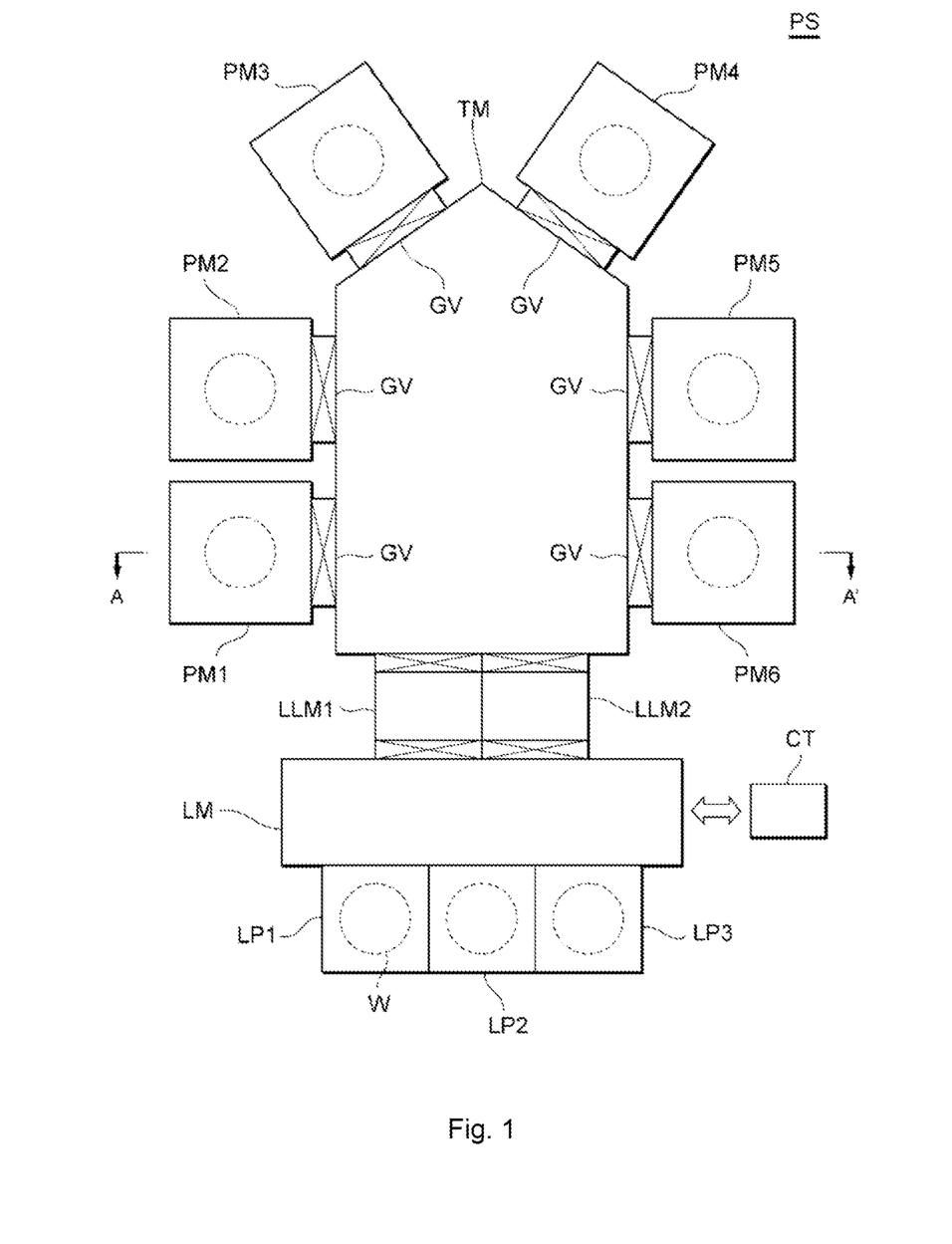
FIG. 1 schematically illustrates one example of a substrate processing system PS.

FIG. 1 schematically illustrates the substrate processing system PS according to one exemplary embodiment. The substrate processing system PS includes substrate processing modules PM1 to PM6 (hereinafter also collectively referred to as "substrate processing module PM"), a transfer module TM, load-lock modules LLM1 and LLM2 (hereinafter also collectively referred to as "load-lock module LLM"), a loader module LM, and load ports LP1 through LP3 (hereinafter also collectively referred to as "load port LP"). A controller CT controls each element of the substrate processing system PS to perform predetermined processing on substrates W.

The substrate processing module PM performs different types of processing such as etching processing, trimming processing, film-forming processing, annealing processing, doping processing, lithography processing, cleaning processing, and ashing processing on a substrate W within the module. Some of the substrate processing modules PM may be a measurement module, which may measure the thickness of layers formed on a substrate W or the dimensions of patterns formed on a substrate W, for example.

The transfer module TM has a conveyer 22 that transfers a substrate W. The transfer module TM transfers a substrate W between the substrate processing modules PM or between one of the substrate processing modules PM and one of the load-lock modules LLM. The substrate processing modules PM and the load-lock modules LLM are disposed adjacent to the transfer module TM. The transfer module TM are spatially isolated from or connected with the substrate processing modules PM or the load-lock modules LLM by openable/closable gate valves GV. In this embodiment, the conveyer 22 (see FIG. 2) in the transfer module TM transfers a substrate W from an interior space 20s (see FIG. 2) of a chamber 20 of the transfer module TM to an interior space 10s of a chamber 10 (see FIG. 2) of the substrate processing module PM to place the substrate W on a substrate support 11. The conveyer 22 also transfers a substrate W from the interior space 10s of the substrate processing module PM to the interior space 20s of the transport module TM. The conveyer 22 moves a substrate W between the transfer module TM and the substrate processing module PM through an opening 12 formed in the chamber 10 of the substrate processing module PM. In one example, the conveyer 22 may be a handler that transfers substrates such as silicon wafers.

The load-lock modules LLM1 and LLM2 are provided between the transfer module TM and the loader module LM. The load-lock module LLM can change its internal pressure between atmospheric pressure and vacuum. The load-lock module LLM transfers a substrate W from the loader module LM at atmospheric pressure to the transfer module TM in vacuum, or transfers a substrate W from the transfer module TM in vacuum to the loader module LM at atmospheric pressure.

The loader module LM has a conveyer that transfers a substrate W to transfer the substrate W between the load-lock module LLM and the load port LP. A front opening unified pod (FOUP) that can store 25 substrates W, for example, or an empty FOUP can be placed inside the load port LP. The loader module LM takes out a substrate W from the FOUP in the load port LP and transfers it to the load-lock module LLM. The loader module LM also takes out a substrate W from the load-lock module LLM and transfers it to the FOUP in the load port LP.

The controller CT controls each element of the substrate processing system PS to perform predetermined processing on a substrate W. The controller CT stores recipes, in which process procedures, process conditions, transfer conditions, and the like are set. The controller CT controls each element of the substrate processing system PS to perform predetermined processing on a substrate W in accordance with the recipes. The controller CT may directly or indirectly control each element illustrated in FIG. 2. The controller CT may electrically or mechanically control each element illustrated in FIG. 2. The mechanical control includes the controlling of each element illustrated in FIG. 2 using gas.

<Configuration of Gate Valve GV>

Figure 2:
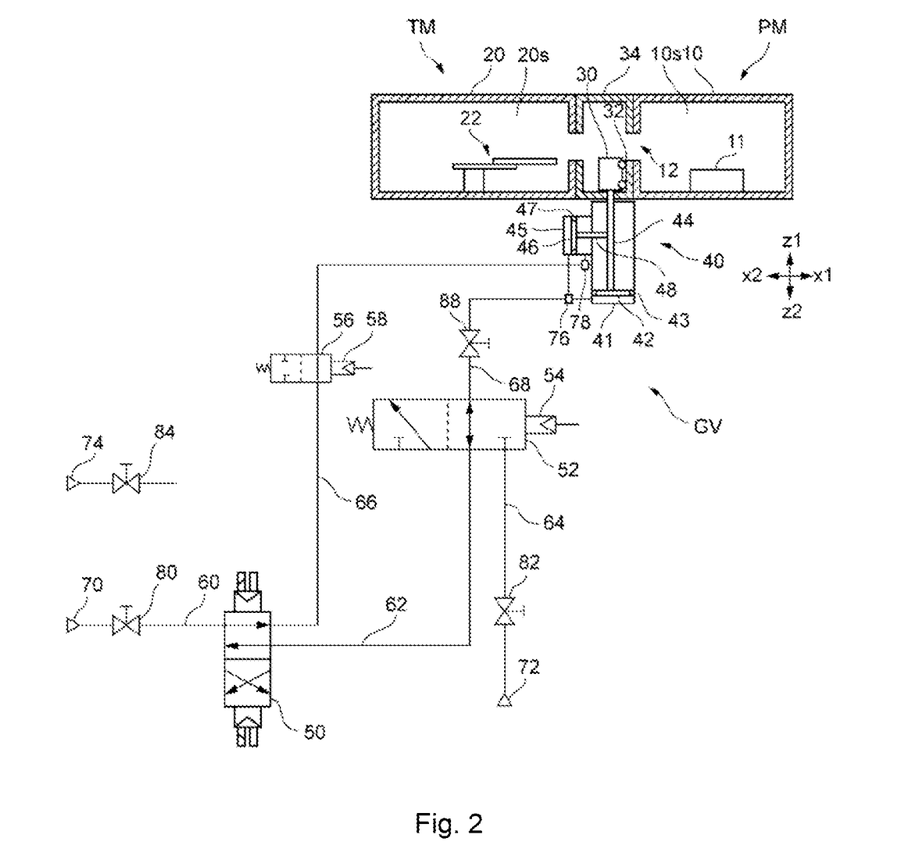
FIG. 2 schematically illustrates one example of the configuration of a gate valve GV.

FIG. 2 schematically illustrates the configuration of a gate valve GV according to one exemplary embodiment. The gate valve GV includes a valve element 30, a drive 40, switching valves 50, 52 and 56, and gas lines 60, 62, 64, 66 and 68. The switching valve 50 is an example of a second switching valve. The switching valve 52 is an example of a first switching valve. The gas lines 62, 64 and 66 are examples of a first gas line, a second gas line and a third gas line, respectively.

The valve element 30 is configured to spatially isolate or connect the interior space 10s of the substrate processing module PM and the interior space 20s of the transfer module TM. In one example, the valve element 30 is housed in a chamber 34, which is connected to the chamber 10 of the substrate processing module PM and the chamber 20 of the transfer module TM. The opening 12 is provided to communicate with the chamber 10 to the chamber 34. The sectional view of the chambers 10, 20 and 34 in FIG. 2 schematically illustrates a part of AA' cross section in FIG. 1.

The valve element 30 includes an O-ring 32. When the valve element 30 presses the O-ring 32 against the inner wall of the chamber 34 around the opening 12, the interior space 10s of the substrate processing module PM and the interior space 20s of the transfer module TM are spatially isolated. When the O-ring 32 leaves the inner wall of the chamber 34, the interior space 10s of the substrate processing module PM and the interior space 20s of the transfer module TM are spatially connected.

The drive 40 is configured to move the valve element 30. In one example, the drive 40 moves the valve element 30 in the interior space of the chamber 34 in x1 direction, x2 direction, z1 direction, and z2 direction in FIG. 2 (hereinafter x1 direction and x2 direction may be collectively referred to as "x direction" and z1 direction and z2 direction may be collectively referred to as "z direction").

The drive 40 has cylinders 41 and 45. The drive 40 has a piston 42 inside the cylinder 41. The piston 42 includes a gasket 43. The drive 40 also has a shaft 44. The shaft 44 has one end connected to the piston 42 and the other end connected to the valve element 30. As the piston 42 moves in z direction inside the cylinder 41, the valve element 30 moves in z direction inside the chamber 34.

The drive 40 has a piston 46 inside the cylinder 45. The piston 46 includes a gasket 47. The drive 40 also has a shaft 48. The shaft 48 has one end connected to the piston 46 and the other end connected to the shaft 44. As the piston 46 moves in x direction inside the cylinder 45, the shaft 44 moves in x direction, so that the valve element 30 moves in x direction inside the chamber 34.

The switching valve 50 has an air supply port and an exhaust port. The gas line 60 is connected to the air supply port of the switching valve 50. Gas is then supplied from a gas source 70 to the air supply port of the switching valve 50 via a valve 80 and the gas line 60. The switching valve 50 connects one of the gas lines 62 and 66 to the air supply port to supply gas from the gas source 70 to the connected gas line, and connects the other gas line to the exhaust port to exhaust the gas flowing through the other gas line. In one example, the switching valve 50 may be a solenoid valve. In one example, the gas supplied from the gas source 70 may be compressed air.

The switching valve 52 connects one of the gas lines 62 and 64 to the gas line 68. The gas line 62 is connected to the air supply port or the exhaust port of the switching valve 50, in accordance with the state of the switching valve 50. Gas is supplied to the gas line 64 from a gas source 72 via a valve 82. The valve 82 may be controlled so that gas is constantly supplied from the gas source 72 to the gas line 64 when the switching valve 52 connects the gas line 64 to the gas line 68.

In one example, the switching valve 52 has a pilot port 54. The switching valve 52 changes its state depending on whether gas is supplied to the pilot port 54 or not. In one example, the switching valve 52 connects the gas line 62 to the gas line 68 when gas is supplied to the pilot port 54, and connects the gas line 64 to the gas line 68 when gas is not supplied to the pilot port 54. In one example, the pilot port 54 may be connected to the gas line 66. That is, the switching valve 52 may connect the gas line 62 to the gas line 68 when gas is supplied from the gas source 70 to the gas line 66, and may connect the gas line 64 to the gas line 68 when the gas line 66 is connected to the exhaust port of the switching valve 50.

In one example, the gas source 70 may supply gas used in the operation of the transfer module TM. When the gas source 70 supplies gas used in the operation of the transfer module TM, the valve 80 may be closed during maintenance of the transfer module TM. That is, during maintenance of the transfer module TM, the gas is not supplied to the transfer module TM and the pilot port 54. Thus, the switching valve 52 connects the gas line 64 to the gas line 68. The drive 40 then receives the gas from the gas source 72.

The gas line 68 is connected to a branch 76 via a valve 88. The branch 76 branches the gas line 68 to connect it to the cylinders 41 and 45. When gas is supplied to the gas line 68, the branch 76 branches the gas supplied to the gas line 68 to supply the gas to the cylinders 41 and 45. The branch 76 adjusts the pressure and/or flow rate of the gas supplied to the gas line 68 to supply the adjusted gas to the cylinder 41. The branch 76 also adjusts the pressure and/or flow rate of the gas supplied to the gas line 68 to supply the adjusted gas to the cylinder 45.

The switching valve 56 changes the connection as to whether or not the gas line 66 is connected to the drive 40. The switching valve 56 has a pilot port 58. The switching valve 56 connects the gas line 66 to the drive 40 when gas is supplied to the pilot port 58, and does not connect the gas line 66 to the drive 40 when gas is not supplied to the pilot port 58.

Gas may be supplied to the pilot port 58 from a gas source 74 via a valve 84. In one example, the gas source 74 may supply gas used in the operation of the substrate processing module PM. When the gas source 74 supplies gas used in the operation of the substrate processing module PM, the valve 84 may be closed during maintenance of the substrate processing module PM. That is, during maintenance of the substrate processing module PM, the gas is not supplied to the substrate processing module PM and the switching valve 56. Thus, the switching valve 56 is closed, so that the gas line 66 is not connected to the drive 40.

The gas line 66 is connected to the drive 40 via a branch 78. The branch 78 branches the gas line 66 to connect it to the cylinders 41 and 45. When gas is supplied to the gas line 66, the branch 78 branches the gas supplied to the gas line 66 to supply the gas to the cylinders 41 and 45. The branch 78 adjusts the pressure and/or flow rate of the gas supplied to the gas line 66 to supply the adjusted gas to the cylinder 41. The branch 78 also adjusts the pressure and/or flow rate of the gas supplied to the gas line 66 to supply the adjusted gas to the cylinder 45.

Referring next to FIGS. 2 to 5 the following describes one example of the operation of the gate valve GV according to the present embodiment.

<Holding Valve Element 30 at Opening Position>

FIG. 2 illustrates one example of the state of the gate valve GV when the valve element 30 is at the opening position. As illustrated in FIG. 2, when the valve element 30 is held at the opening position, the switching valve 50 connects the gas line 66 to the air supply port of the switching valve 50 and connects the gas line 62 to the exhaust port. With this arrangement, when gas is supplied from the gas source 70 to the gas line 66, the gas is supplied from the gas line 66 to the pilot port 54 and the switching valve 52 connects the gas line 62 to the gas line 68. This connects the space in z2 direction relative to the piston 42 in the interior space of the cylinder 41 and the space in x2 direction relative to the piston 46 in the interior space of the cylinder 45 to the exhaust port of the switching valve 50.

Gas is then supplied to the space in z1 direction relative to the piston 42 in the interior space of the cylinder 41 and the space in x1 direction relative to the piston 46 in the interior space of the cylinder 45 from the gas source 70 via the gas line 66 and the branch 78. This causes the piston 42 to be pressed in z2 direction and the piston 46 to be pressed in x2 direction. Thus, the valve element 30 is held at the opening position illustrated in FIG. 2.

When the valve element 30 is at the opening position, the position of holding the valve element 30 is not limited to the illustrated position. The valve element 30 may be located so that the interior space 10s of the substrate processing module PM and the interior space 20s of the transfer module TM are spatially connected. The valve element 30 may be located so that the conveyer 22 can transfer the substrate W to the substrate support 11 through the opening 12.

<Moving Valve Element 30 from Opening Position to Closing Position>

Figure 3:
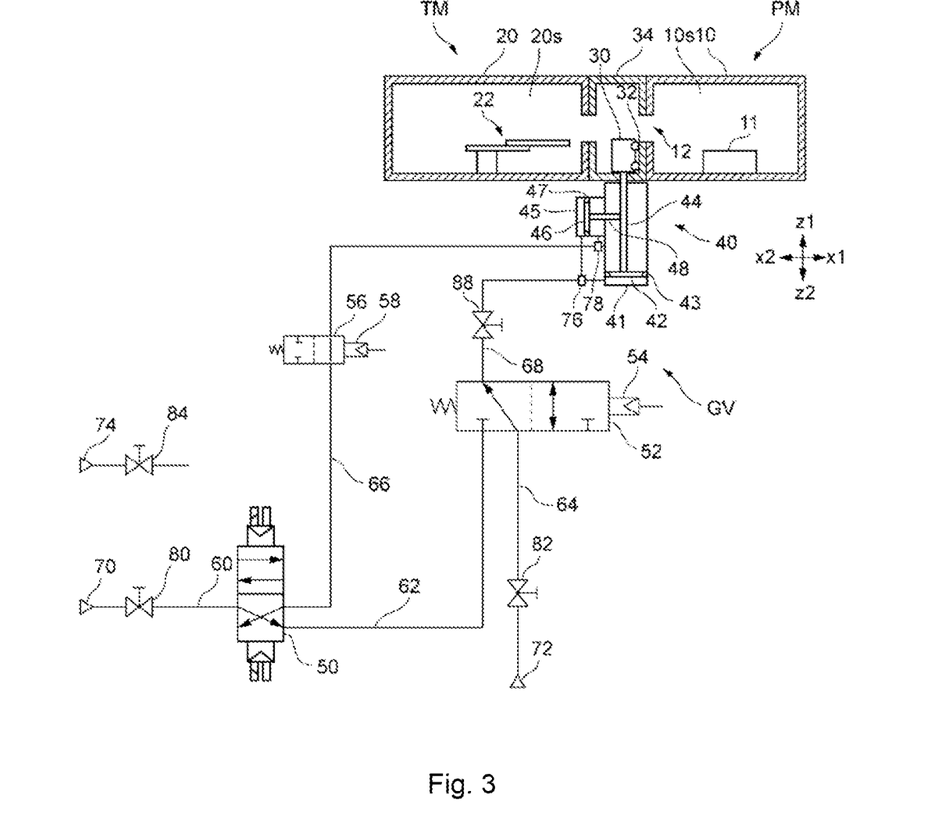
FIG. 3 schematically illustrates one example of a state of a gate valve GV.

FIG. 3 schematically illustrates one example of the state of the gate valve GV when the valve element 30 moves from the opening position to the closing position. When the valve element 30 moves from the opening position to the closing position, the switching valve 50 connects the gas line 66 to the exhaust port of the switching valve 50 and connects the gas line 62 to the air supply port. With this arrangement, gas is not supplied from the gas source 70 to the pilot port 54. The switching valve 52 then connects the gas line 64 to the gas line 68. With this arrangement, gas is supplied to the space in z2 direction relative to the piston 42 in the interior space of the cylinder 41 and the space in x2 direction relative to the piston 46 in the interior space of the cylinder 45 from the gas source 72.

This connects the space in z1 direction relative to the piston 42 in the interior space of the cylinder 41 and the space in x1 direction relative to the piston 46 in the interior space of the cylinder 45 to the exhaust port via the gas line 66. This causes the piston 42 to be pressed in z1 direction and the piston 46 to be pressed in x1 direction. As a result, the valve element 30 moves in z1 direction and x1 direction in FIG. 3.

<Holding Valve Element 30 at Closing Position>

Figure 4:
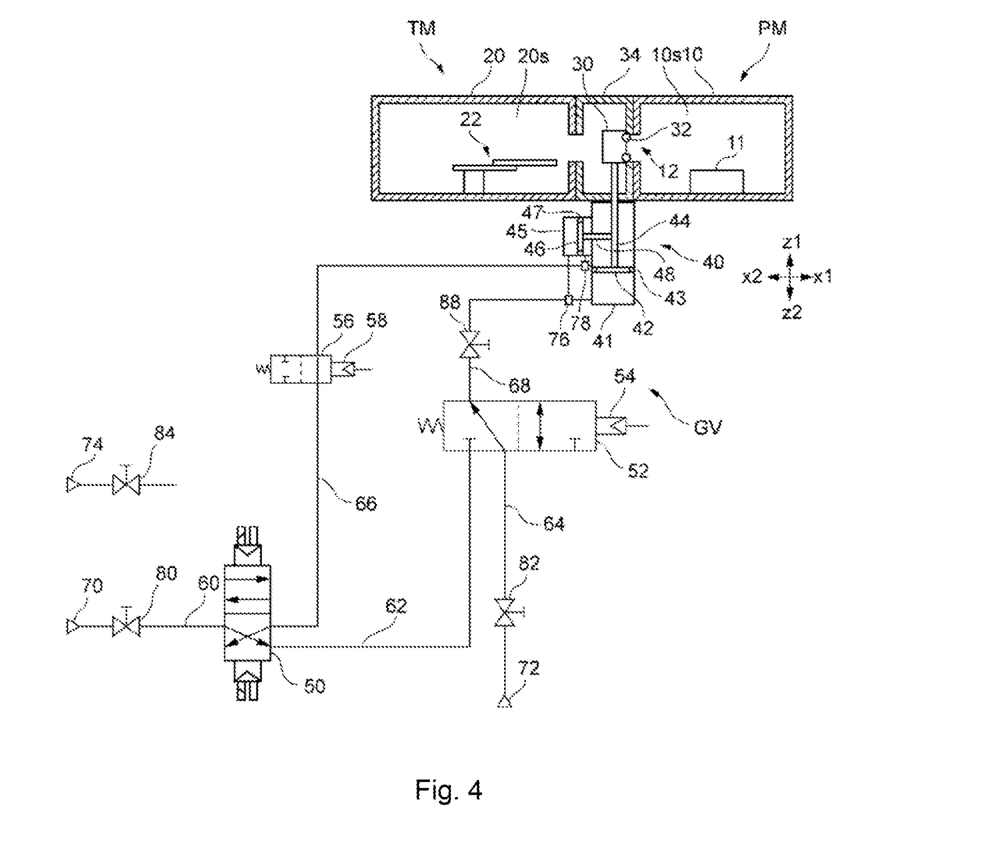
FIG. 4 schematically illustrates one example of a state of a gate valve GV.

FIG. 4 schematically illustrates one example of the state of the gate valve GV when the valve element 30 is at the closing position. After the valve element 30 moves from the opening position in z1 and x1 directions to close the opening 12 as illustrated in FIG. 4, the switching valves 50 and 52 may continue to assume the same state illustrated in FIG. 3. That is, the switching valve 50 may connect the gas line 66 to the exhaust port. The switching valve 52 may connect the gas line 64 to the gas line 68. This arrangement allows gas to be supplied from the gas source 72 to the cylinders 41 and 45, even after the valve element 30 moves to the closing position. Thus, after the valve element 30 moves to the closing position, i.e., when the valve element 30 is held at the closing position, the gas supplied from the gas source 72 can give sufficient pressure to the pistons 42 and 46 in z1 and x1 directions, respectively, in the cylinders 41 and 45. This causes the valve element 30 to be pressed against the inner wall of the chamber 34 and spatially isolates the interior space 10s of the substrate processing module PM from the interior space 20s of the transfer module TM.

According to this embodiment, when the valve element 30 is held at the closing position, the gas supplied from the gas source 72 presses the valve element 30 against the inner wall of the chamber 34 while keeping a predetermined pressure. This reduces a gas leakage from the interior space 10s to the interior space 20s even when the pressure in the interior space 10s of the substrate processing module PM is higher than the pressure in the interior space 20s of the transfer module TM.

<Moving Valve Element 30 from Closing Position to Opening Position>

Figure 5:
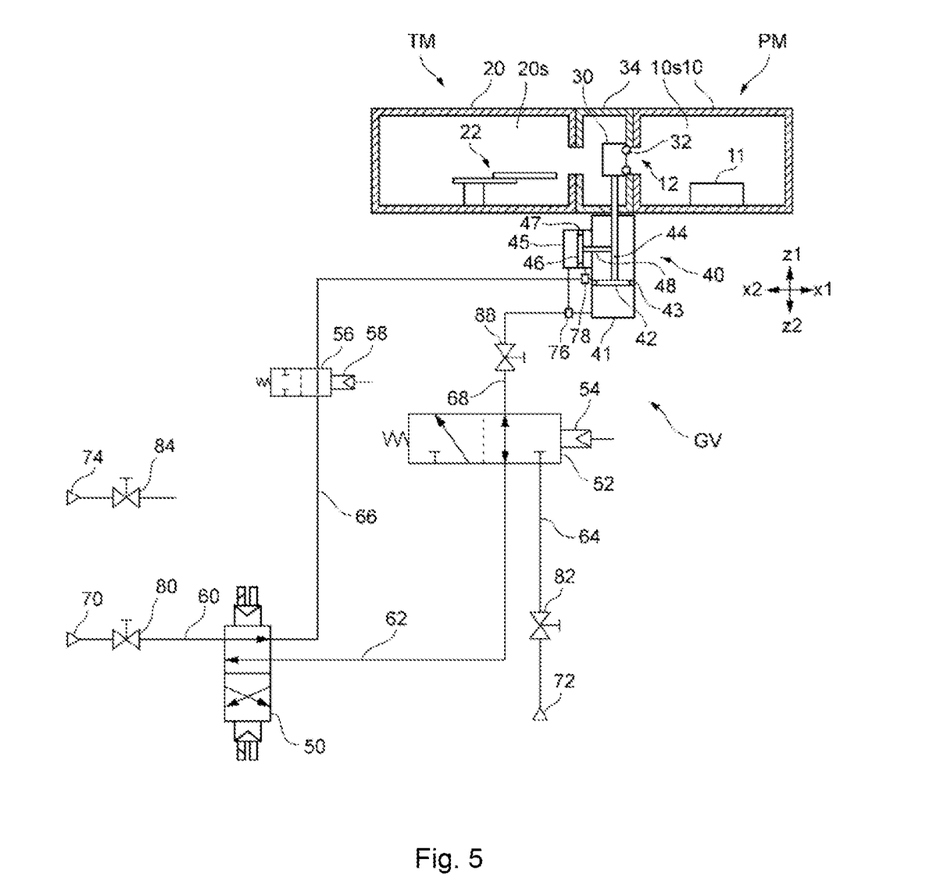
FIG. 5 schematically illustrates one example of a state of a gate valve GV.

FIG. 5 schematically illustrates one example of the state of the gate valve GV when the valve element 30 moves from the closing position to the opening position. When the valve element 30 moves from the closing position to the opening position, the switching valve 50 connects the gas line 66 to the air supply port of the switching valve 50 and connects the gas line 62 to the exhaust port. With this arrangement, when gas is supplied from the gas source 70 to the gas line 66, the gas is supplied from the gas line 66 to the pilot port 54, and the switching valve 52 connects the gas line 62 to the gas line 68. This connects the space in z2 direction relative to the piston 42 in the interior space of the cylinder 41 and the space in x2 direction relative to the piston 46 in the interior space of the cylinder 45 to the exhaust port of the switching valve 50.

Gas is then supplied to the space in z1 direction relative to the piston 42 in the interior space of the cylinder 41 and the space in x1 direction relative to the piston 46 in the interior space of the cylinder 45 from the gas source 70 via the gas line 66 and the branch 78. This causes the piston 42 to be pressed in z2 direction and the piston 46 to be pressed in x2 direction. As a result, the valve element 30 moves in z2 direction and x2 direction in FIG. 5. When the valve element 30 moves from the closing position in z2 and x2 directions to reach the opening position, the valve element 30 is held at the opening position as illustrated in FIG. 2.

Figure 6:
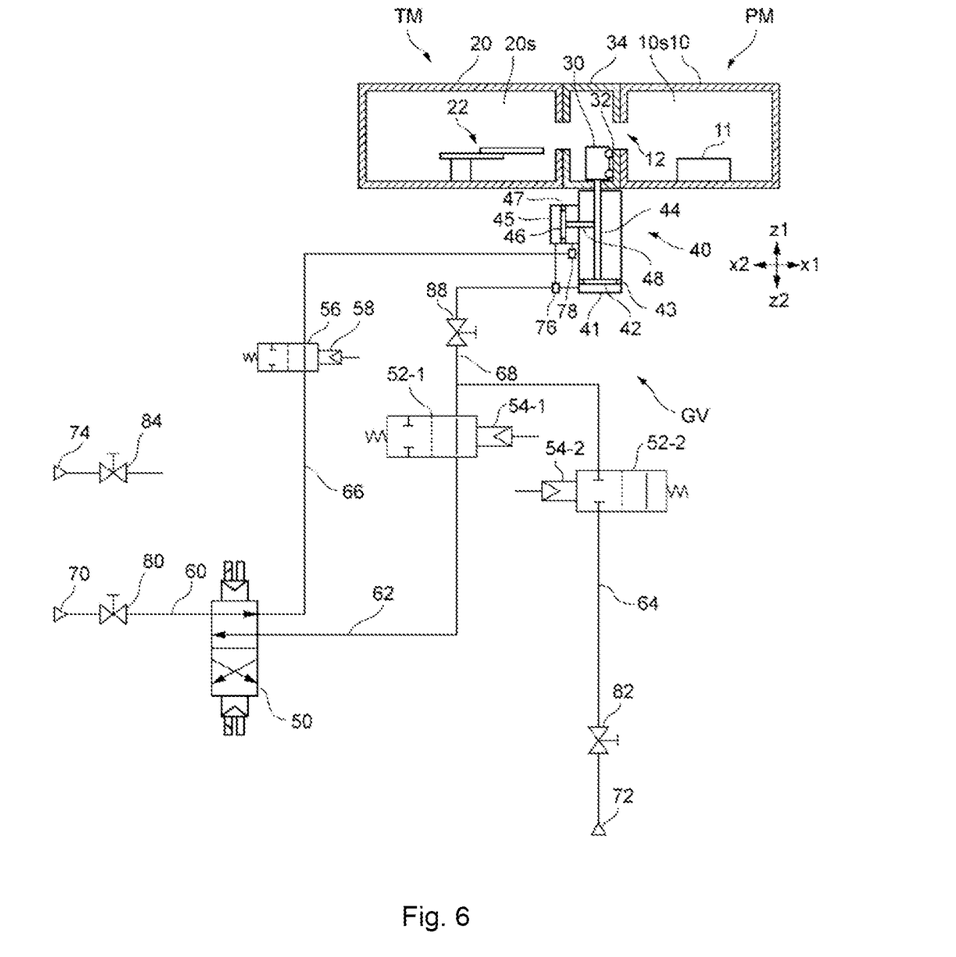
FIG. 6 schematically illustrates one example of the configuration of a gate valve GV.

FIG. 6 schematically illustrates the configuration of a gate valve GV according to another exemplary embodiment. FIG. 6 illustrates one example of the state of the gate valve GV when the valve element 30 is at the opening position. The gate valve GV illustrated in FIG. 6 has switching valves 52-1 and 52-2 instead of the switching valve 50 in the gate valves GV illustrated in FIGS. 2 through 5.

The switching valve 52-1 changes the connection as to whether or not the gas line 62 is connected to the gas line 68. The switching valve 52-2 changes the connection as to whether or not the gas line 64 is connected to the gas line 68. The switching valve 52-1 has a pilot port 54-1. The switching valve 52-2 has a pilot port 54-2. The pilot ports 54-1 and 54-2 are both connected to the gas line 66.

The switching valve 52-1 is a normally closed valve. The switching valve 52-2 is a normally open valve. That is, as illustrated in FIG. 6, when gas is supplied from the gas source 70 through the gas line 66 to the pilot ports 54-1 and 54-2, the switching valve 52-1 connects the gas line 62 to the gas line 68, and the switching valve 52-2 does not connect the gas line 64 to the gas line 68. When gas is not supplied from the gas source 70 through the gas line 66 to the pilot ports 54-1 and 54-2, the switching valve 52-1 does not connect the gas line 62 to the gas line 68, and the switching valve 52-2 connects the gas line 64 to the gas line 68. That is, the switching valves 52-1 and 52-2 are configured to connect one of the gas lines 62 and 64 to the gas line 68.

With this configuration, the gate valve GV described in FIG. 6 moves the valve element 30 from the opening position to the closing position and can hold the valve element 30 at the closing position, and moves the valve element 30 from the closing position to the opening position and can hold the valve element 30 at the opening position in a similar manner to the gate valve GV described in FIGS. 2 through 5.

According to the embodiments described above, the gate valve GV can hold the valve element 30 at the closing position using gas (e.g., the gas supplied from the gas source 72) that can be controlled independently of the gas used for the operation of the substrate processing module PM and/or the operation of the transfer module TM. This can provide a gate valve that reduces a leakage between the substrate processing module PM and the transfer module TM, even during maintenance of the substrate processing module PM and/or the transfer module TM.

One exemplary embodiment of the present disclosure can provide a gate valve and a driving method that can reduce a gas leakage.

The above embodiments are just for illustration of the present disclosure, and are not intended to limit the present disclosure. Various modifications may be made to the above embodiments without departing from the scope and spirit of the present disclosure. For instance, some elements in one embodiment can be added in other embodiments. Some elements in one embodiment can be replaced with corresponding elements in other embodiments.

What is claimed is:

1. A gate valve that opens and closes a first opening of a first chamber in a vacuum processing apparatus, the gate valve comprising:
    a valve element configured to open and close the first opening;
    a drive configured to move the valve element so that the valve element takes at least a closing position, where the valve element closes the first opening, and an opening position, where the valve element opens the first opening;

a first gas line and a second gas line; and
a first switching valve that connects one of the first gas line and the second gas line to the drive,
wherein the drive is configured to:
move the valve element from the opening position to the closing position by pressure of gas supplied from the first gas line or the second gas line; and
hold the valve element at the closing position by pressure of gas supplied from the second gas line, and
wherein the first switching valve has a normally closed valve that changes a connection as to whether or not to supply gas from the first gas line to the drive, and a normally open valve that changes a connection as to whether or not to supply gas from the second gas line to the drive.

2. The gate valve according to claim 1, wherein the drive has an air cylinder that moves the valve element, and the first switching valve changes a connection as to whether the air cylinder is connected to the first gas line or to the second gas line.

3. The gate valve according to claim 2, further comprising a third gas line connected to the drive, wherein
the drive holds the valve element at the opening position by pressure of gas supplied from the third gas line.

4. The gate valve according to claim 3, further comprising a second switching valve that changes a connection as to whether gas is supplied to the first gas line or to the third gas line.

5. The gate valve according to claim 4, wherein the gas supplied to the first gas line, the gas supplied to the second gas line, and the gas supplied to the third gas line are compressed air.

6. A method for driving a gate valve that opens and closes a first opening of a first chamber in a vacuum processing apparatus,
the gate valve including:
a valve element configured to open and close the first opening;
a drive configured to move the valve element so that the valve element takes at least a closing position, where the valve element closes the first opening, and an opening position, where the valve element opens the first opening;
a first gas line and a second gas line; and
a first switching valve that connects one of the first gas line and the second gas line to the drive,
the driving method comprising:
moving the valve element from the opening position to the closing position by pressure of gas supplied from the first gas line or the second gas line; and
holding the valve element at the closing position by pressure of gas supplied from the second gas line,
wherein the first switching valve has a normally closed valve that changes a connection as to whether or not to supply gas from the first gas line to the drive, and a normally open valve that changes a connection as to whether or not to supply gas from the second gas line to the drive.

7. The method according to claim 6, wherein the drive has an air cylinder that moves the valve element, and
the first switching valve changes a connection as to whether the air cylinder is connected to the first gas line or to the second gas line.

8. The method according to claim 7, further comprising a third gas line connected to the drive, wherein
the drive holds the valve element at the opening position by pressure of gas supplied from the third gas line.

9. The method according to claim 8, further comprising a second switching valve that changes a connection as to whether gas is supplied to the first gas line or to the third gas line.

10. The method according to claim 8, wherein the gas supplied to the first gas line, the gas supplied to the second gas line, and the gas supplied to the third gas line are compressed air.

* * * * *